(12) United States Patent
Chen et al.

(10) Patent No.: US 8,140,068 B2
(45) Date of Patent: Mar. 20, 2012

(54) TECHNIQUES FOR FEEDBACK IN CELLULAR SYSTEMS TO MITIGATE INTERFERENCE IN DOWNLINK

(75) Inventors: Clark Chen, Beijing (CN); Hujun Yin, San Jose, CA (US); Hongmei Sun, Beijing (CN); Hua Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1027 days.

(21) Appl. No.: 12/057,452

(22) Filed: Mar. 28, 2008

(65) Prior Publication Data

US 2009/0247148 A1   Oct. 1, 2009

(51) Int. Cl.
*H04W 24/00* (2009.01)
(52) U.S. Cl. .............. 455/423; 455/63.1; 455/114.2; 455/278.1; 455/296

(58) Field of Classification Search .............. 455/421, 455/422.1, 423–425, 63.1, 114.2, 278.1, 455/296
See application file for complete search history.

(56) References Cited

U.S. PATENT DOCUMENTS

| | | | |
|---|---|---|---|
| 2003/0129985 A1* | 7/2003 | Naden et al. | 455/447 |
| 2007/0004430 A1* | 1/2007 | Hyun et al. | 455/456.1 |
| 2007/0218950 A1* | 9/2007 | Codreanu et al. | 455/562.1 |
| 2009/0086861 A1* | 4/2009 | Yavuz et al. | 375/346 |
| 2010/0211540 A9* | 8/2010 | Das et al. | 707/603 |

* cited by examiner

*Primary Examiner* — Wayne Cai
(74) *Attorney, Agent, or Firm* — Thorpe North & Western LLP

(57) ABSTRACT

An embodiment of the present invention provides a method, comprising broadcasting base station (BS) channel allocation methods and supported interference mitigation techniques in a whole cell by the base station and reporting classification information by mobile stations (MSs) within the cell to said base station about their preferred interference mitigation (IM) techniques.

21 Claims, 5 Drawing Sheets

TECHNIQUES FOR FEEDBACK IN CELLULAR SYSTEMS TO MITIGATE INTERFERENCE IN DOWNLINK

BACKGROUND

In an OFDMA based cellular system that applies a single frequency band for all base stations (BSs), there exists serious down link (DL) interference for users at cell edges and sector edges. Interference mitigation is vital for improved cellular communications.

Thus, a strong need exists for improved techniques to mitigate interference.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
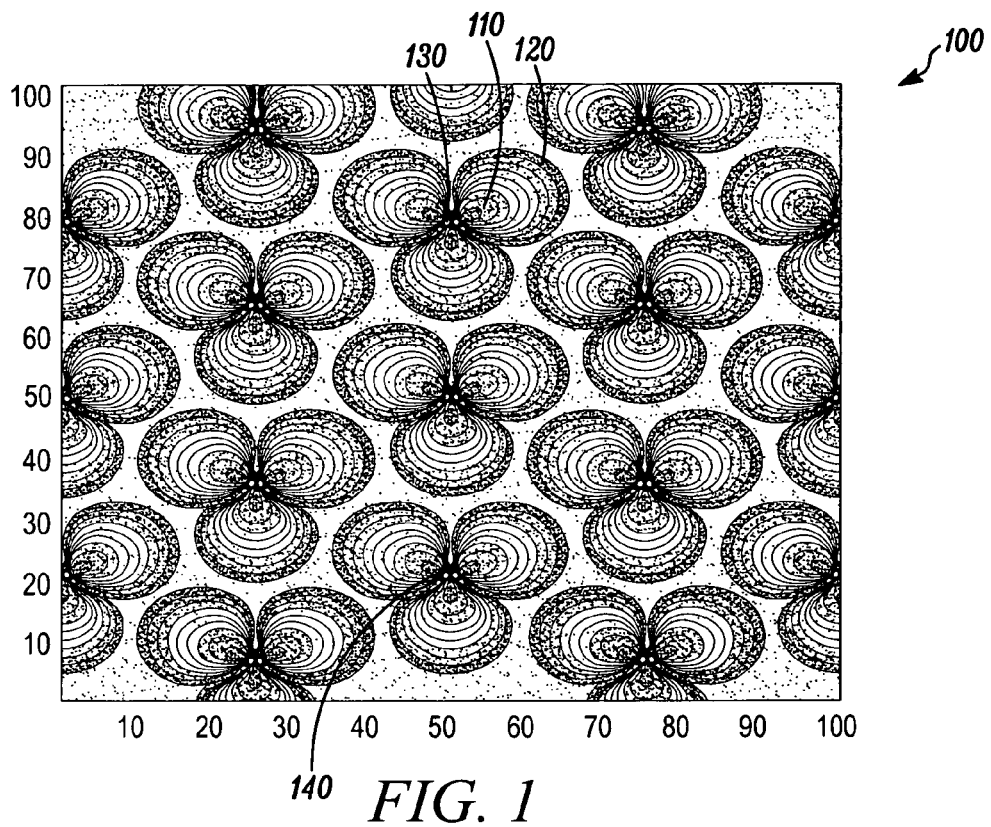
FIG. 1 shows the signal to noise ratio (SINR) distribution of a classic cellular network topology with multiple cells in hexagon shapes and three sectors per cell.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device or a handheld PDA device.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

In an OFDMA based cellular system that applies a single frequency band for all base statuibs, there exists serious DL interference for users at cell edges and sector edges. FIG. 1, shown generally as 100, shows the SINR distribution of a classic cellular network topology with multiple cells 130 and 140 in hexagon shapes and three sectors per cell.

The area exemplified as 110 is a high SINR area, while those exemplified as 120 are low SINR ones. As can be seen from FIG. 1, the areas near cell boundaries are experiencing low SINR (down to −5 dB~−10 dB).

Figure 2:
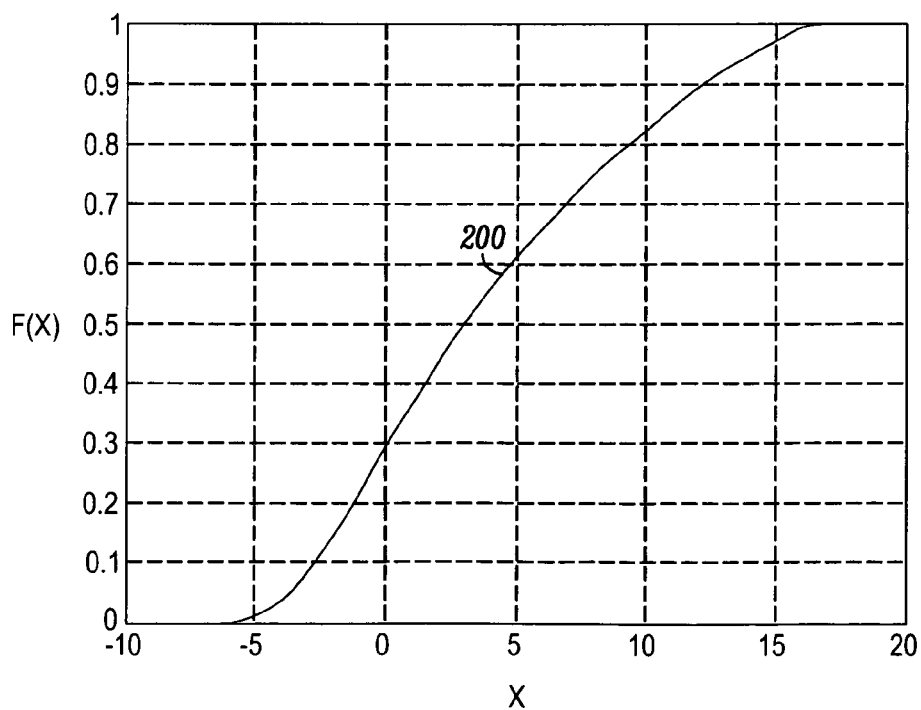
FIG. 2 shows the average SINR's "Cumulative Distribution Function" of uniformly distributed mobile stations in the network topology shown in FIG. 1.

Turning now to FIG. 2 is a graphical depiction showing the average SINR's "Cumulative Distribution Function" 200 of uniformly distributed mobile stations in the network topology shown in FIG. 1. It can be seen that 30% mobile station's SINR are below 0 dB.

Figure 3:
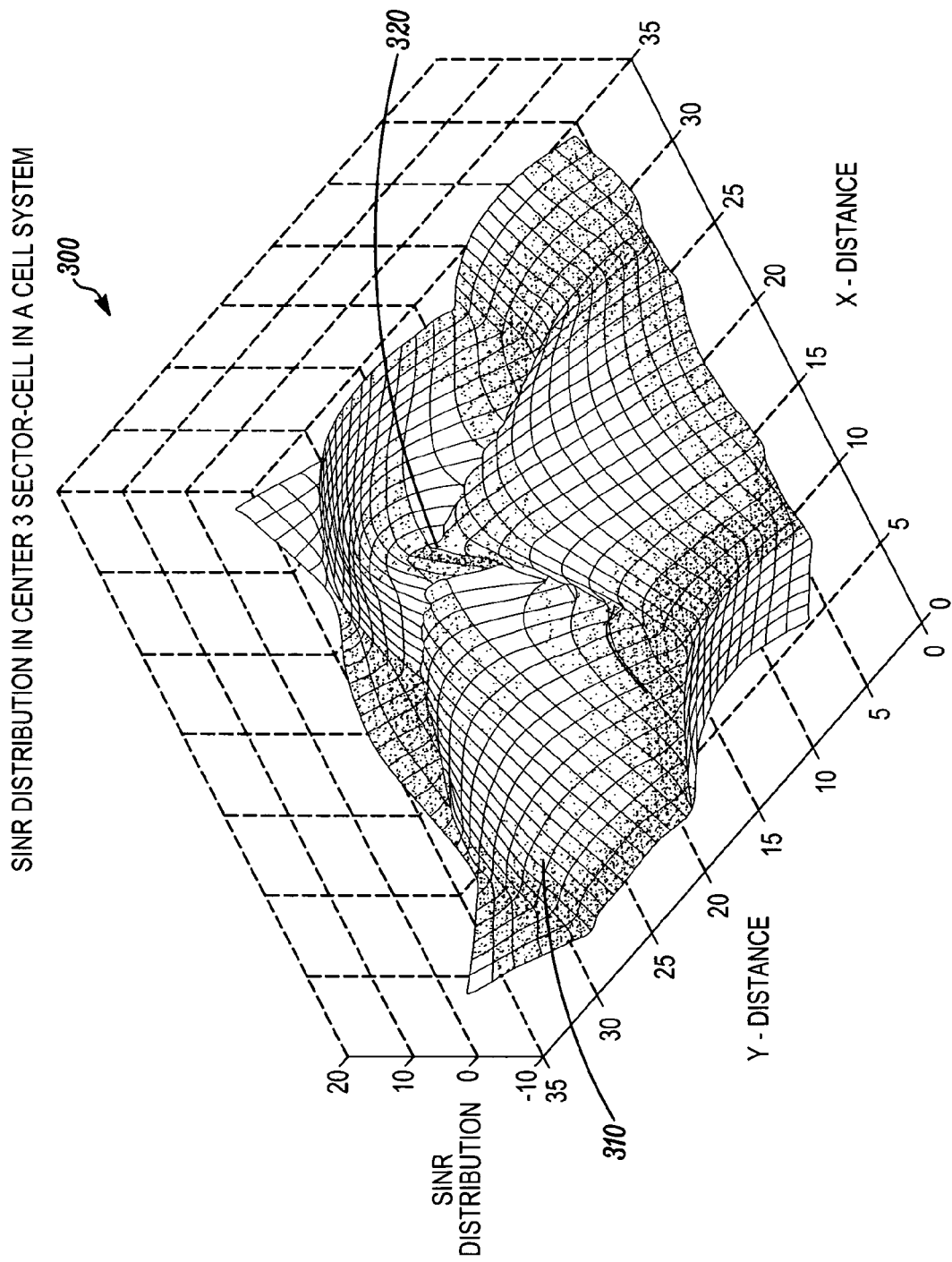
FIG. 3 shows the SINR distribution within one cell with 3 sectors of an embodiment of the present invention.

FIG. 3 at 300 shows the SINR distribution within one cell with 3 sectors. It clearly shows that the area near cell geological edges 310, a user's SINR drops significantly and forms a "valley" comparing to center areas 320. On the boundary of sectors of this cell, there also exists an SINR "valley" caused by the neighbor sector's interfering signal. It is clear that these different SINR "valley" areas are caused by different interference conditions that can be explored to increase system throughput.

Currently multiple techniques are provided herein that can help mitigate interference experienced by users with low SINR. FFR (Fractional Frequency Reuse), Fast Sector Switching, Sector Micro Diversity are known to those or ordinary skill in the art. These techniques are designed to be most effective in different interference scenarios. One open issue is about how/when to use which techniques. FFR, in general, is effective when the target MS has a large number of interference sources under frequency reuse factor. By increasing the reuse factor from 1 to 3, its SINR could be greatly improved, while at the cost of more bandwidth. FSS (Fast Sector Switch), works well when there is 1 major interference source which has comparable power to that of the desired signal source. By exploring the fast fluctuation of mobile channels, FSS can provide much higher throughput for mobile stations with strong signal and one strong interference source. However, this technology does not work for mobile stations with more than one major interference sources, where each individual interferer is much weaker than the signal. SMD (Sector Micro Diversity) can help users at the far end edge of two neighbor sectors where both the signal and neighboring sector interference are weak. There are other weak interference sources from neighboring cells as well. By combining the power of two neighboring sectors, these users can achieve decent SINR.

Table 1 below shows the effectiveness and comparison of the above interference mitigation methods.

|  | Effective for | Not Effective for | Classification method |
| --- | --- | --- | --- |
| Fractional frequency Reuse | Cell edge users with large number of interference source at reuse-1 zone | FFR is not the most efficient way for Sector edge users where major interference come from one neighbor sector from cell perspective | Interference level is high and there are more than one major interference source. |
| Fast Sector Switch | Sector edge users where major interference come from one neighbor sector, and signal/interference are both strong | Cell edge users with large number of interference source at reuse-1 zone | Mobile station location; Major interference source comes from one neighbor sector in the same BS and has comparable signal strength |
| Sector Micro Diversity or Beamforming | Sector edge users where major interference come from one neighbor sector, and signal/interference are both weak | Cell edge users with a large number of interference source at reuse-1 zone | Mobile station location; One major interference source comes from neighbor sector in the same BS. |

In the DL, the BS will decide what kind of interference mitigation technology is applied for certain mobile station. However, each mobile station has the best knowledge of its DL interference environment. Traditionally, only SINR level and/or CQI (Channel Quality Indication) are feedback to the BS. This information is not sufficient to determine the best method to do interference mitigation for specific MS.

Thus, an embodiment of the present invention provides additional feedback information from mobile stations (MS) to base stations (BS) to facilitate and enhance the interference mitigation process. The procedure is illustrated as follows. The BS channel allocation method and supported interference mitigation techniques are broadcast in the whole cell. Mobile stations in the cell, will measure the SINR on different FFR bands, signal strength, position information etc. and report a 2-bit classification information about their preferred IM techniques (or, said another way but not limited in this respect, which MS class it belongs to). The available choices include, but are not limited to:

TABLE 1

Interference profiles and their corresponding effective IM techniques

| Interference environment class | Preferred Interference Mitigation techniques |
| --- | --- |
| 00 Strong Signal, weak interference | None. Normal transmission |
| 01 Strong Signal, one major interference | Fast Sector Switch |
| 10 Weak Signal, Strong interference | Fractional Frequency Reuse |
| 11 Weak Signal, weak interference | Sector Micro Diversity or Beamforming |

Figure 4:
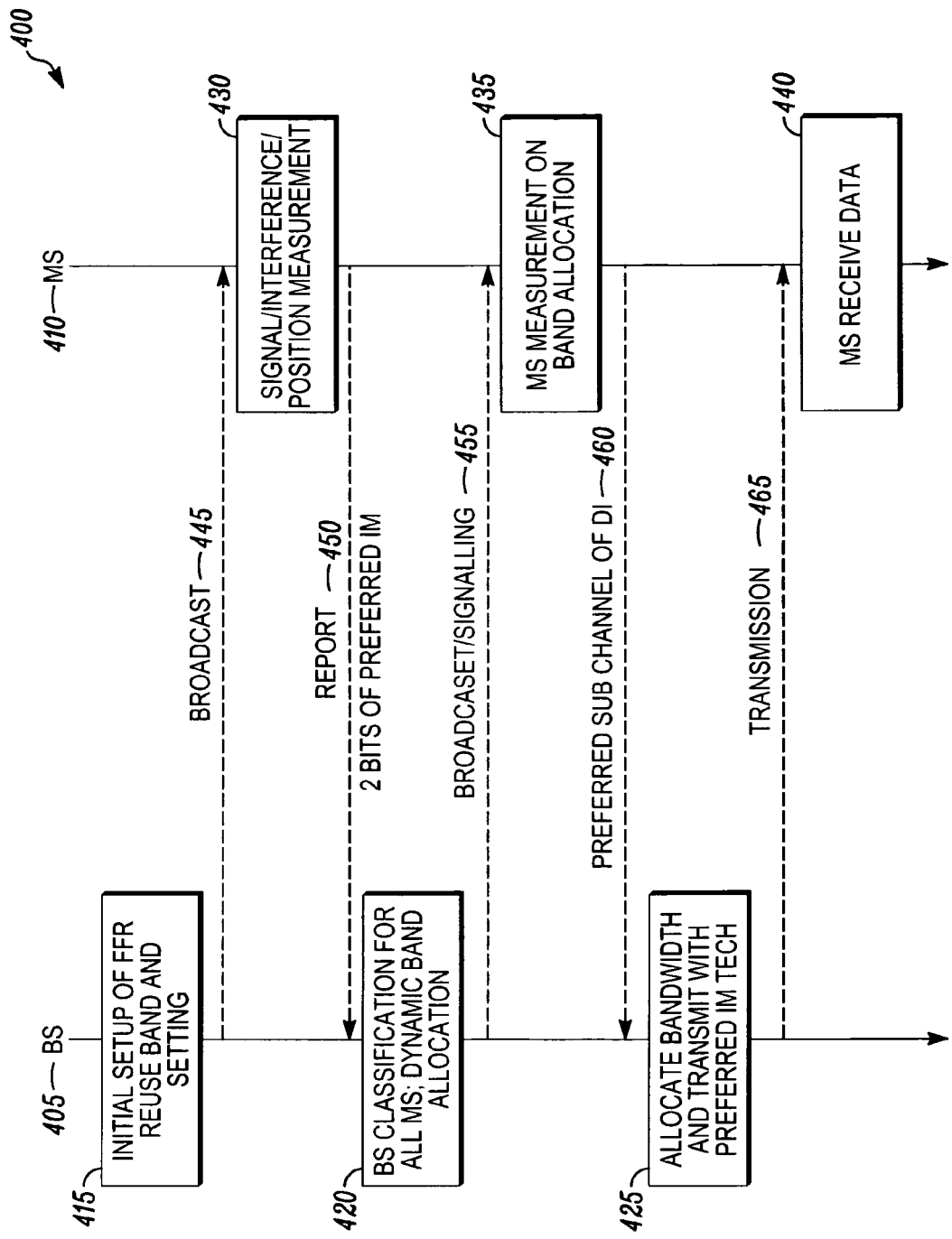
FIG. 4 depicts an information exchange procedure between a base station (BS) and a mobile station (MS) in support of MS interference measurements of an embodiment of the present invention.

Looking now at FIG. 4, shown generally as 400, is an information exchange procedure between BS 405 and MS 410 in support of MS interference measurements of an embodiment of the present invention. At 415 is BS initial set up and FFR reuse band and setting at 445 is broadcast with receipt by MS 410 at 430 with MS providing signal/interference/position measurement and reporting at 450 to BS 405. At 420 is BS classification for all MS, dynamic band allocation with broadcast/signaling at 455. At 435 MS measures on the band allocation and at 460 reports preferred sub-channel of DL is transmitted back to BS. At 425 BS allocate bandwidth and transmit data with preferred IM tech. 465 depicts the transmission and MS 410 reception of data at 440.

After receiving this feedback information from MS 410, BS 405 can adjust MS classification groups to support future scheduling/signaling of DL packets. Moreover, MS 410 can report or change its preferred IM techniques along variation of its interference environment. For an MS that is fixed or moving at low speeds, it needs only to report its preferred IM techniques once in a long time interval. For mobile stations with higher mobile speed and relatively fast changing interference environment, it needs to report this information more frequently. BS 405 may decide whether to adjust its resource pool for different classes of mobile stations accordingly. One example, although the present invention is not limited in this respect, is to adjust the re-use bandwidth division in Fractional Frequency Reuse tech for the best system performance.

Figure 5:
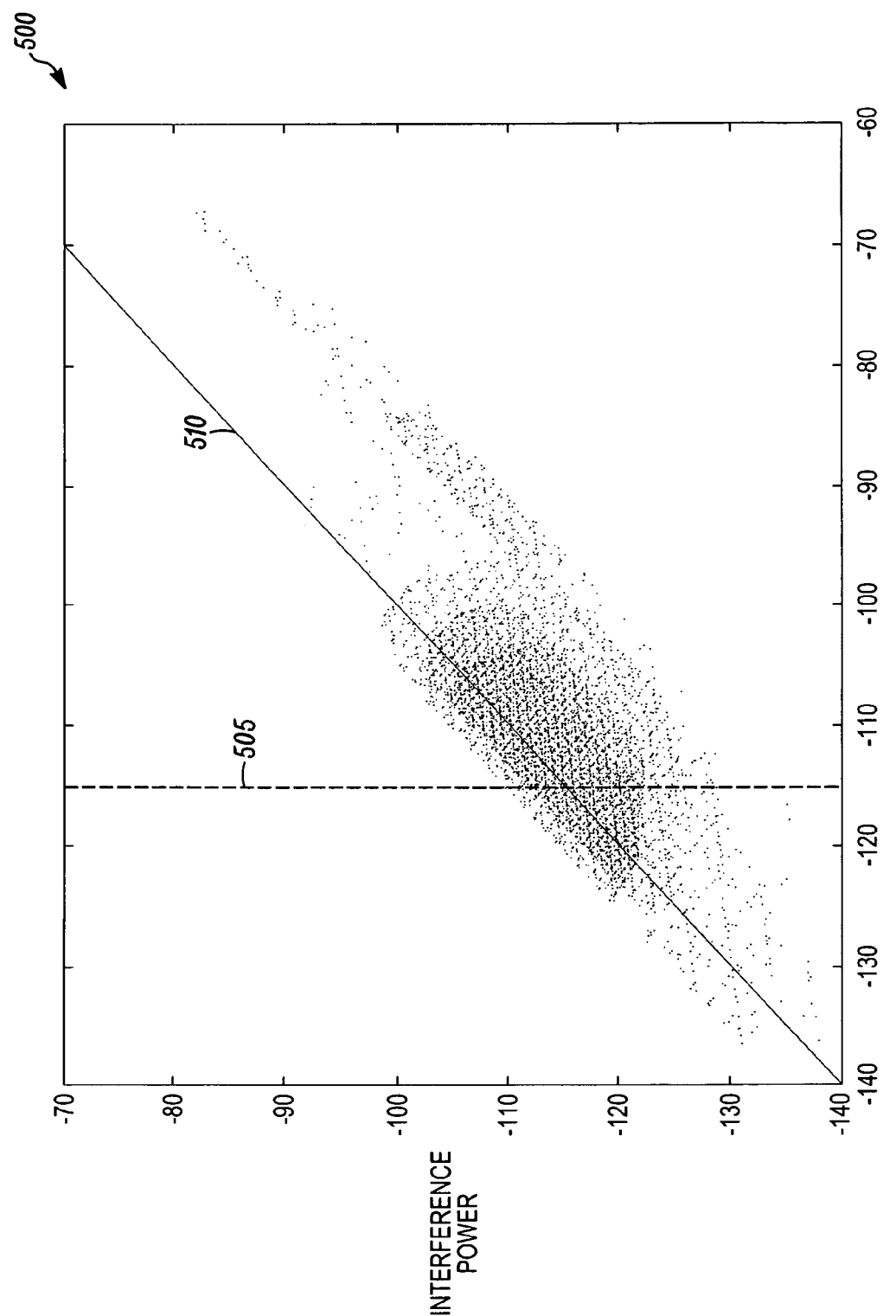
FIG. 5 illustrates the distribution of MS signal/interference strength in an SFN of an embodiment of the present invention.

Simulation results in FIG. 5 graphically shown generally as 500, show the distribution of signal/interference strength of uniformly distributed MS in a Single Frequency Network cellular system with reuse 1×3×1.

Figure 6:
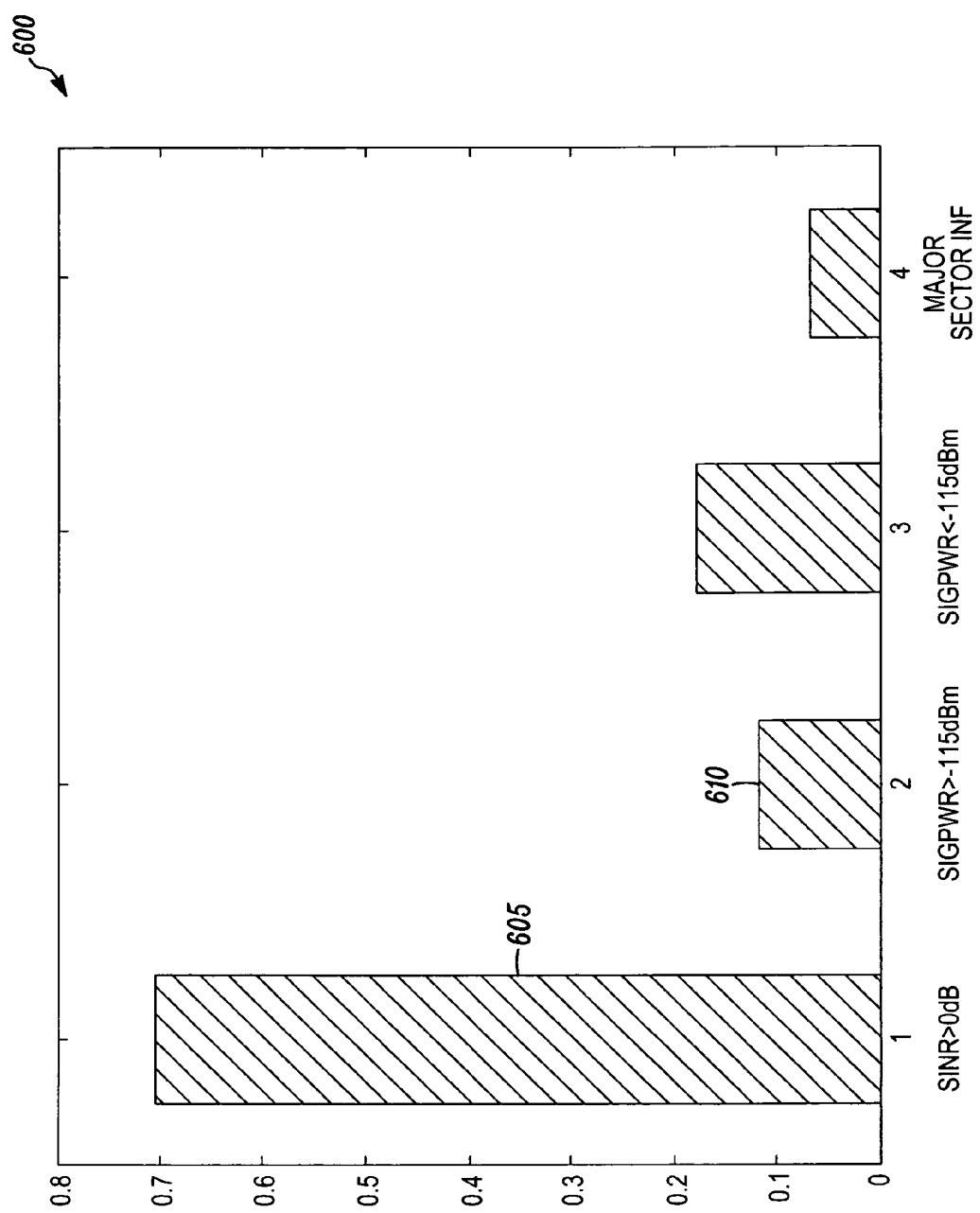
FIG. 6 illustrates MS distribution of an embodiment of the present invention.

In FIG. 5, the vertical line 505 separates MS with its signal strength weaker (left to the line) or stronger (right to the line) than −115 dbm, while the diagonal line 510 separates MS with its signal strength weaker (left to the line) or stronger (right to the line) than its interference strength. In FIG. 6 the first bar 605 of graph 600 shows that on average 70% MS have SINR>0 dB. The 2nd bar 610 shows that 12% of the MS has both SINR above 0 dB and signal power higher than −115 dBm, while the 18% has SINR above 0 dB and signal power less than −115 dBm. At the same time, there are about 6% MS having their major interference coming from other neighboring sectors the belong to its home BS. This figure clearly shows that different MS in the system have distinct interference scenarios and this information could help mitigate interference with the most effective techniques for each of the MS.

Traditionally, the interference condition is measured and reported in the form of SINR, which provide neither the relative strength of signal and interference, nor the number of dominate interferers. Therefore, in conventional systems, neither the MS nor the BS has a clear idea of what kind of interference environment the MS is at. Without this information, the BS can not make best choice on interference mitigation techniques: whether to increase the TX power to the target MS, or schedule the MS with resource zones with higher reuse factor, or beamforming is needed.

Embodiments of the present invention clearly differentiate target MS's interference profiles in a complex multi-cell system. This greatly helps the BS to make better decisions on how to utilize different interference techniques to address different interference issues for the target MS.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A method comprising:
   broadcasting base station (BS) channel allocation methods and a plurality of supported interference mitigation techniques in a whole cell by a base station,
   wherein the supported interference mitigation techniques are selected from the group consisting of fractional frequency reuse (FFR), fast sector switching, and sector micro diversity or beaming,
   wherein said whole cell is adjacent to at least one additional cell that can cause interference in mobile stations (MSs) in at least a boundary area of the whole cell; and
   receiving classification information at the base station from the MSs within said whole cell about the MS's preferred interference mitigation (IM) techniques from the plurality of supported interference mitigation techniques.

2. The method of claim 1, further comprising receiving a 2-bit reporting classification information at the base station from the MSs to identify the preferred IM technique for the MS from the plurality of supported IM techniques.

3. The method of claim 2, wherein said preferred interference mitigation techniques are based upon said MS measuring signal to noise ratio (SINR) on different fractional frequency reuse FFR bands, signal strength and position information.

4. The method of claim 2, wherein said 2-bit reporting classification is: 00—Strong Signal, weak interference; 01—Strong Signal, one major interference; 10—Weak Signal, Strong interference; 11—Weak Signal, weak interference.

5. The method of claim 4, wherein for interference environment class 00—Strong Signal, weak interference, the Preferred Interference Mitigation technique is None or Normal transmission; for interference environment class 01—Strong Signal, one major interference, the Preferred Interference Mitigation technique is fast sector switch; for interference environment class 10—Weak Signal, Strong interference, the Preferred Interference Mitigation technique is FFR; for interference environment class 11—Weak Signal, weak interference, the Preferred Interference Mitigation technique is FFR.

6. The method of claim 1, further comprising after receiving classification information from said MS, said BS can adjust MS classification groups to support at least one of future scheduling and signaling of downlink packets.

7. The method of claim 1, wherein said MS can report or change its preferred IM techniques according to a variation of its interference environment and for an MS that is fixed or moving at low speeds, it needs only to report its preferred IM techniques once in a long time interval and for mobile stations with higher mobile speed and relatively fast changing interference environment, it needs to report this information more frequently.

8. A system, comprising:
   a base station (BS) adapted to broadcast channel allocation methods and a plurality of supported interference mitigation techniques in a whole cell, wherein said whole cell is adjacent to at least one additional cell that can cause interference in mobile stations (MSs) in at least a boundary area of the whole cell,
   wherein the supported interference mitigation techniques are selected from the group consisting of fractional frequency reuse (FFR), fast sector switching, and sector micro diversity or beam forming; and
   the BS configured to receive classification information from a mobile station (MS) within said whole cell about the mobile station's preferred interference mitigation (IM) techniques from the plurality of supported interference mitigation techniques.

9. The system of claim 8, wherein said report classification information is a 2-bit reporting classification information to identify the preferred IM technique for the MS from the plurality of supported IM techniques.

10. The system of claim 9, wherein said preferred interference mitigation techniques are based upon said MS measuring signal to noise ratio (SINR) on different fractional frequency reuse FFR bands, signal strength and position information.

11. The system of claim 9, wherein said 2-bit reporting classification is: 00—Strong Signal, weak interference; 01—Strong Signal, one major interference; 10—Weak Signal, Strong interference; 11—Weak Signal, weak interference.

12. The system of claim 11, wherein for interference environment class 00—Strong Signal, weak interference, the Preferred Interference Mitigation technique is None or Normal transmission; for interference environment class 01—Strong Signal, one major interference, the Preferred Interference Mitigation technique is fast sector switch; for interference environment class 10—Weak Signal, Strong interference, the Preferred Interference Mitigation technique is FFR; for interference environment class 11—Weak Signal, weak interference, the Preferred Interference Mitigation technique is FFR.

13. The system of claim 8, wherein after receiving classification information from said MS, said BS can adjust MS classification groups to support at least one of future scheduling and signaling of downlink packets.

14. The method of claim 8, wherein said MS can report or change its preferred IM techniques according to a variation of its interference environment and for an MS that is fixed or moving at low speeds, it needs only to report its preferred IM techniques once in a long time interval and for mobile stations with higher mobile speed and relatively fast changing interference environment, it needs to report this information more frequently.

15. A mobile station (MS), comprising:
   a transceiver configured to communicate with a base station within a cell;
   wherein said MS is located within said cell and is adapted to receive a broadcast of channel allocation methods and a plurality of supported interference mitigation techniques from the base station to each MS in said entire cell,
   wherein the supported interference mitigation techniques are selected from the group consisting of fractional frequency reuse (FFR), fast sector switching, and sector micro diversity or beam forming; and wherein said MS is configured to report classification information within said cell to said BS about its preferred interference mitigation (IM) techniques from the plurality of supported IM techniques.

16. The MS of claim 15, wherein said report classification information is a 2-bit reporting classification information to identify the preferred IM technique for the MS from the plurality of supported IM techniques.

17. The MS of claim 16, wherein said preferred interference mitigation techniques are based upon said MS measuring a signal to noise ratio (SINR) on different fractional frequency reuse (FFR) bands, signal strength, and position information.

18. The MS of claim 16, wherein said 2-bit reporting classification is: 00—Strong Signal, weak interference; 01—Strong Signal, one major interference; 10—Weak Signal, Strong interference; 11—Weak Signal, weak interference.

19. The MS of claim 18, wherein for interference environment class 00—Strong Signal, weak interference, the Preferred Interference Mitigation technique is None or Normal transmission; for interference environment class 01—Strong Signal, one major interference, the Preferred Interference Mitigation technique is fast sector switch; for interference environment class 10—Weak Signal, Strong interference, the Preferred Interference Mitigation technique is FFR; for interference environment class 11—Weak Signal, weak interference, the Preferred Interference Mitigation technique is FFR.

20. The MS of claim 15, wherein after receiving classification information from said MS, said BS can adjust MS classification groups to support at least one of future scheduling and signaling of downlink (DL) packets.

21. The MS of claim 15, wherein said MS can report or change its preferred IM techniques according to a variation of its interference environment and for an MS that is fixed or moving at low speeds, it needs only to report its preferred IM techniques once in a long time interval and for mobile stations with higher mobile speed and relatively fast changing interference environment, it needs to report this information more frequently.

* * * * *